United States Patent
Wang et al.

(10) Patent No.: US 10,629,209 B2
(45) Date of Patent: Apr. 21, 2020

(54) VOICEPRINT RECOGNITION METHOD, DEVICE, STORAGE MEDIUM AND BACKGROUND SERVER

(71) Applicant: PING AN TECHNOLOGY (SHENZHEN) CO., LTD., Shenzhen, Guangdong (CN)

(72) Inventors: Jianzong Wang, Shenzhen (CN); Hui Guo, Shenzhen (CN); Jicheng Song, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 85 days.

(21) Appl. No.: 15/772,801

(22) PCT Filed: Jun. 26, 2017

(86) PCT No.: PCT/CN2017/090046
§ 371 (c)(1),
(2) Date: May 1, 2018

(87) PCT Pub. No.: WO2018/149077
PCT Pub. Date: Aug. 23, 2018

(65) Prior Publication Data
US 2019/0272829 A1    Sep. 5, 2019

(30) Foreign Application Priority Data
Feb. 16, 2017    (CN) .......................... 2017 1 0083629

(51) Int. Cl.
*G10L 17/00*    (2013.01)
*G10L 17/02*    (2013.01)
*G10L 17/04*    (2013.01)

(52) U.S. Cl.
CPC .............. *G10L 17/02* (2013.01); *G10L 17/04* (2013.01)

(58) Field of Classification Search
USPC .................................. 704/231–257, 270–275
See application file for complete search history.

(56) References Cited

U.S. PATENT DOCUMENTS 7,240,007 B2 *   7/2007  Junqua .................... G10L 15/24
                                                             704/246
2001/0056350 A1  12/2001 Calderone et al.
(Continued)

FOREIGN PATENT DOCUMENTS

CN        1936967 A       3/2007
CN      101923855 A      12/2010
(Continued)

OTHER PUBLICATIONS

Pavel Matejka et al., Full-Covariance RBM and Heavy-Tailed PLDA in I-Vector Speaker Verification, Bmo University of Technology, 2011, pp. 4828-4831.
(Continued)

*Primary Examiner* — Jesse S Pullias
(74) *Attorney, Agent, or Firm* — Loza & Loza, LLP; Michael F. Fedrick

(57) ABSTRACT

The present invention provides a voiceprint recognition method, a device, a storage medium and a background server. The voiceprint recognition method comprises: collecting, by a client, and sending a voice recognition request to the background server, the voice recognition request comprises the user ID and the test voice; receiving the voice recognition request, and determining the voice recognition request to be processed with a message queue and an asynchronous mechanism; acquiring a target voiceprint feature which corresponds to the user ID of the voice recognition request to be processed, and acquiring a test voice- (Continued)

print feature which corresponds to the test voice of the voice recognition request to be processed; judging whether the target voiceprint feature and the test voiceprint feature correspond to the same user, and outputting the result of the judging to the client; and receiving and displaying, by the client, the result of the judging.

12 Claims, 2 Drawing Sheets

(56) References Cited

U.S. PATENT DOCUMENTS

| | | | | |
|---|---|---|---|---|
| 2006/0015335 | A1* | 1/2006 | Vennelakanti | G10L 15/30 704/235 |
| 2010/0017209 | A1* | 1/2010 | Yu | G06F 21/32 704/246 |
| 2015/0112680 | A1* | 4/2015 | Lu | G10L 17/04 704/244 |
| 2015/0249664 | A1* | 9/2015 | Talhami | G06F 21/32 726/6 |
| 2017/0358306 | A1* | 12/2017 | Xue | G10L 15/07 |

FOREIGN PATENT DOCUMENTS

| | | |
|---|---|---|
| CN | 102324232 A | 1/2012 |
| CN | 102402985 A | 4/2012 |
| CN | 102509547 A | 6/2012 |
| CN | 103035245 | 4/2013 |
| CN | 103730114 A | 4/2014 |
| CN | 103915096 | 7/2014 |
| CN | 104835498 A | 8/2015 |
| CN | 106847292 A | 6/2017 |
| EP | 0643520 | 10/1994 |
| JP | 2002304379 | 10/2002 |
| JP | 2015011867 | 3/2017 |
| WO | 2016137042 | 9/2016 |

OTHER PUBLICATIONS

Office Action for corresponding Australian Patent Application No. 2017341161, dated Mar. 25, 2019, 6 pages.
Office Action for corresponding Japanese Patent Application No. 2018514332, dated Apr. 2, 2019, 6 pages.
Office Action for corresponding Korean Patent Application No. 952019037217747, dated May 24, 2019, 9 pages.
Office Action for corresponding Chinese Patent Application No. 201710083629.0 dated Jan. 30, 2018, 32 pages.

* cited by examiner

VOICEPRINT RECOGNITION METHOD, DEVICE, STORAGE MEDIUM AND BACKGROUND SERVER

CROSS-REFERENCE TO RELATED APPLICATIONS

The present application is the U.S. national stage of International Patent Application No. PCT/CN2017/090046, filed on Jun. 26, 2017 and entitled VOICEPRINT RECOGNITION METHOD, DEVICE, STORAGE MEDIUM AND BACKGROUND SERVER, which claims the benefit of priority under 35 U.S.C. § 119 from Chinese Patent Application No. 201710083629.0 with the title "VOICEPRINT RECOGNITION METHOD AND DEVICE", which was filed on Feb. 16, 2017. The entire content of the foregoing applications is incorporated herein by reference.

FIELD OF THE INVENTION

The present invention relates to the technical field of identity recognition of a biological feature, and further relates to a voiceprint recognition method, a device, a storage medium, and a background server.

BACKGROUND OF THE INVENTION

Voiceprint recognition refers to an identity recognition technology of a speaker according to the biological feature of the speaker implied in the voice. Because the voiceprint recognition is secure and reliable, the voiceprint recognition can be used in almost all security protection areas and personalization application occasions where identity recognition is required. For example, banking, securities, insurances and other financial institutions continue to expand business volume, resulting in a large number of recognition needs. Compared with the traditional recognition technology, the advantage of voiceprint recognition is that the voiceprint extraction process is simple, the cost is low, and the voiceprint feature of every person is different from the voiceprint features of others, unique, and difficult to be counterfeited and faked. Because of the characteristics such as safety, reliability, convenience, etc., the voiceprint recognition is widely used in the occasions where identity recognition is required. However, the existing voiceprint recognition process takes too much time. When a large number of voice recognition requests are processed, it is easy to lose some voice recognition requests due to a long processing time, which affects the application of the voiceprint recognition technology.

SUMMARY OF THE INVENTION

The technical problem to be solved in the present invention lies in that, aiming at deficiencies in the prior art, there are a voiceprint recognition method, a device, a storage medium, and a background server, which can improve the processing efficiency of a large number of voice recognition requests and shorten the processing time.

The technical solution used by the present invention to solve the technical problem is as follows: a voiceprint recognition method, comprising:

collecting, by a client, a test voice of a user, and sending a voice recognition request to the background server, the voice recognition request comprises the user ID and the test voice;

receiving, by the background server, the voice recognition request, and determining the voice recognition request to be processed with a message queue and an asynchronous mechanism;

acquiring, by the background server, a target voiceprint feature which corresponds to the user ID of the voice recognition request to be processed, and acquiring a test voiceprint feature which corresponds to the test voice of the voice recognition request to be processed;

judging, by the background server according to the target voiceprint feature and the test voiceprint feature, whether the target voiceprint feature and the test voiceprint feature correspond to the same user, and outputting the result of the judging to the client; and receiving and displaying, by the client, the result of the judging.

The present invention further provides a voiceprint recognition device, comprising:

a client configured to collect a test voice of a user and send a voice recognition request to the background server, the voice recognition request comprises the user ID and the test voice;

a background server configured to receive the voice recognition request and determine the voice recognition request to be processed with a message queue and an asynchronous mechanism;

a background server configured to acquire a target voiceprint feature which corresponds to the user ID of the voice recognition request to be processed, and acquire a test voiceprint feature which corresponds to the test voice of the voice recognition request to be processed;

a background server configured to judge, according to the target voiceprint feature and the test voiceprint feature, whether the target voiceprint feature and the test voiceprint feature correspond to the same user, and output the result of the judging to the client; and a client configured to receive and display the result of the judging.

The present invention further provides a background server, comprising a memory, a processor, and a computer program stored in the memory and executable on the processor, wherein the processor, when executing the computer program, implements the steps executed by the background server in the voiceprint recognition method described above.

The present invention further provides a computer-readable storage medium in which a computer program is stored, wherein the computer program, when being executed by a processor, implements the steps executed by the background server in the voiceprint recognition method described above.

Compared with the prior art, the present invention has the following advantages: in the voiceprint recognition method and device provided by the present invention, the background server acquires a corresponding target voiceprint feature based on the user ID in the voice recognition request to be processed, and acquires a test voiceprint feature based on the test voice in the voice recognition request to be processed, and compares the target voiceprint feature with the test voiceprint feature to determine whether the speakers of the target voiceprint feature and the test voiceprint feature are the same user, which may achieve a fast voice recognition effect and improve the voice recognition efficiency. In addition, the background server determines the voice recognition request to be processed with a message queue and an asynchronous mechanism so as to improve the processing efficiency of a large number of voice recognition requests, and avoid the loss of some voice recognition requests due to a long processing time.

BRIEF DESCRIPTION OF THE DRAWINGS

The present invention will be further described with reference to the accompanying drawings and embodiments, in which.

DETAILED DESCRIPTION OF THE PREFERRED EMBODIMENTS

In order to have a clearer understanding of the technical features, the purposes and the effects of the present invention, the implementation of the present invention will be described in detail with reference to the accompanying drawings.

Embodiment 1

Figure 1:
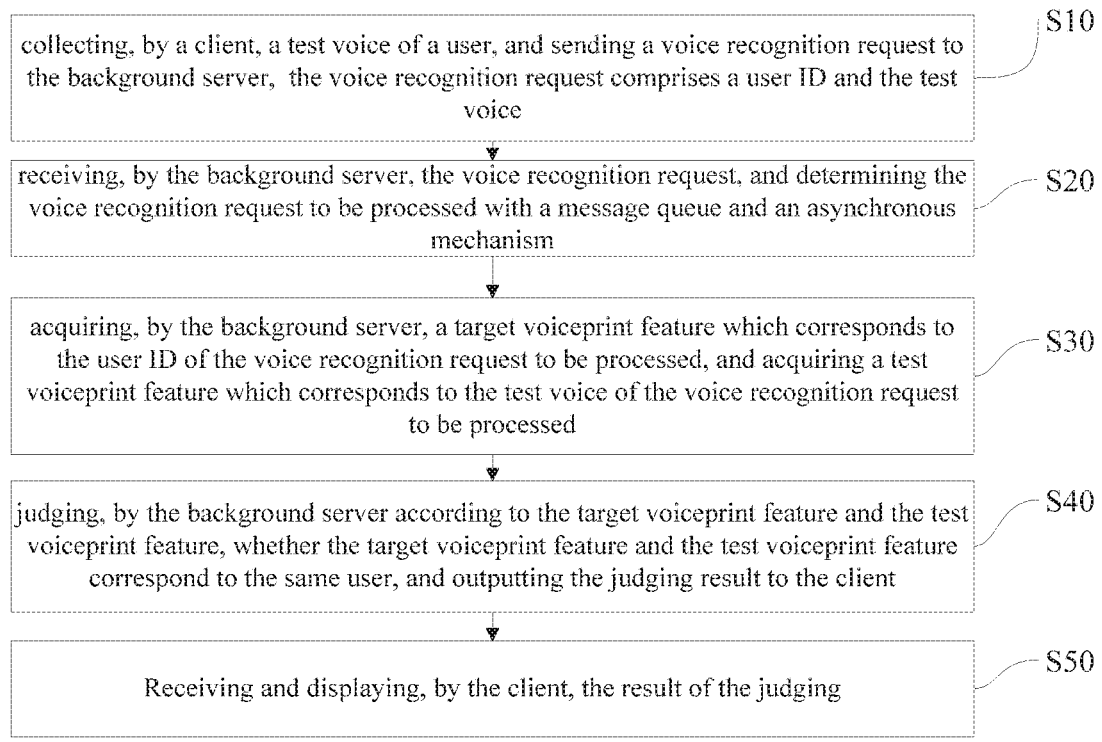
FIG. 1 is a flow chart of a voiceprint recognition method according to Embodiment 1 of the present invention.

FIG. 1 shows a flow chart of a voiceprint recognition method in the embodiment. The voiceprint recognition method may be applied on the client and the background server to perform identity recognition on the test voice collected by the client. As shown in FIG. 1, the voiceprint recognition method comprises the following steps.

S10: The client collects a test voice of a user, and sends a voice recognition request to the background server, wherein the voice recognition request comprises the user ID and the test voice.

The client comprises a terminal capable of communicating with a background server, such as a smart phone, a notebook, a desktop computer, etc., and the client is provided with a microphone configured to collect the test voice or an external microphone interface. The user ID is used to uniquely identify the user ID. In the present embodiment, the test voice is associated with the user ID, and is configured to determine a user corresponding to the test voice. The client performs sampling and recording on the user, acquires the test voice in a way audio format, forms a voice recognition request according to the test voice and the user ID, and sends the voice recognition request to the background server.

Further, when the client is a mobile client, a multi-thread method is used to collect the test voice; when the client is a webpage client, an Ajax asynchronous refreshing method is used to collect the test voice so as to not interrupt user operation when communicating with the background server and to increase the collecting speed of a test request. Ajax (Asynchronous JavaScript and XML), Asynchronous JavaScript and XML are web application development methods that use client scripts to exchange data with a web server.

S20: The background server receives the voice recognition request, and determines the voice recognition request to be processed with a message queue and an asynchronous mechanism.

The background server receives the voice recognition request sent by at least one client, and places at least one voice recognition request into the message queue for waiting. The background server uses an asynchronous mechanism to schedule at least one voice recognition request in the message queue so that the transmitter and the receiver are independent of each other when the background server processes each message in the message queue without waiting for the other party to respond. The message queue and asynchronous mechanism is used to schedule at least one voice recognition request to acquire the voice recognition request to be processed so that the background server may receive a large number of voice recognition requests at the same time and avoid the loss of a large number of other voice recognition requests due to a long processing time of any voice recognition request to be processed. On the other hand, the message queue and asynchronous mechanism is also used so as to build a distributed system in the background server, which may improve the peak processing capacity and flexibility of voice recognition requests, reduce the coupling degree between processes, and ensure that each voice recognition request can be processed.

S30: The background server acquires a target voiceprint feature which corresponds to the user ID of the voice recognition request to be processed, and acquires a test voiceprint feature which corresponds to the test voice of the voice recognition request to be processed.

In an embodiment, the target voiceprint feature is a voiceprint feature of a user corresponding to the user ID pre-stored in the background server. The test voiceprint feature is the voiceprint feature which corresponds to the test voice in the voice request. The voiceprint is an acoustic wave spectrum carrying verbal information and displayed using an electro-acoustic instrument. Correspondingly, the voiceprint feature comprises, but is not limited to, an acoustic feature related to the anatomical structure of a human vocalization mechanism such as a spectrum, a cepstrum, a formant, a pitch, a reflection coefficient, a nasal sound, a voice with a deep breath, a hoarse voice, a laughter, etc.

In the present embodiment, the target voiceprint feature and the test voiceprint feature are preferably I-vector (i.e., identifying vector) features. Correspondingly, any of I-vector features can be acquired by an I-vector algorithm. The i-vector algorithm is a method for estimating a hidden variable. A fixed-length low-dimensional vector is used to represent a segment of voices. Instead of considering the variances within and between classes separately, the variances within and between classes are considered in a subspace (i.e., the total variability space) in the process of extracting the I-vector features, so that they may be trained in an unsupervised manner and language-neutral information may be removed in the total variability space. Language-related acoustic information is reserved to the utmost extent while reducing the dimensionality and denoising.

Further, in an embodiment, step S30 comprises the following steps.

S31: A voiceprint feature library is queried according to the user ID of the voice recognition request to be processed to acquire the target voiceprint feature which corresponds to the user ID of the voice recognition request to be processed.

In an embodiment, at least one group of user IDs and the target voiceprint feature associated with the user IDs are pre-stored in the voiceprint feature library, so as to look for the corresponding target voiceprint feature based on the user ID in the voice recognition request to be processed.

S32: The test voiceprint feature of the voice recognition request to be processed is processed using a Gaussian mixture model-universal background model to acquire the test voiceprint feature which corresponds to the test voice of the voice recognition request to be processed.

The Gaussian mixture model-universal background model (referred to as GMM-UBM in short) is a speaker-independent, high-order GMM that trains voice adaptive training according to the speaker. That is to say, the voice model reflects the pronunciation that is not contained in the model through the speaker in his own voice and distributes approximate description with a speaker-independent voice feature, which has a characteristic such as a high recognition rate.

In an embodiment, the background server places the received voice recognition request into the message queue for waiting. When a process is idle, the voice recognition request to be processed is removed from the message queue to be handed to a background Servlet container for processing, the Servlet container creates an HttpRequest object, the sent information is encapsulated into this object, a HttpResponse object is created at the same time, the HttpRequest and the HttpResponse are passed to the HttpServlet object as parameters, the service method of the HttpServlet object is invoked, and the Gaussian mixture model-universal background model is invoked to process the test voice in the service method to acquire the test voiceprint feature.

S40: The background server judges, according to the target voiceprint feature and the test voiceprint feature, whether the target voiceprint feature and the test voiceprint feature correspond to the same user, and outputs the result of the judging to the client.

Since the target voiceprint feature is a voiceprint feature associated with the user ID and pre-stored in the voiceprint feature library, and the test voiceprint feature is a voiceprint feature which corresponds to the test voice associated with the user ID and collected by the client, if the target voiceprint feature and the test voiceprint feature are the same or have a similarity that reaches a preset similarity threshold, it may be believed that the target voiceprint feature and the test voiceprint feature correspond to the same user, so as to output the result of the judging that the target voiceprint feature and the test voiceprint feature correspond to the same user or do not correspond to the same user to the client.

Further, in an embodiment, the step S40 comprises the following steps.

S41: The dimensionality of the target voiceprint feature and the test voiceprint feature is reduced respectively with a PLDA algorithm, to acquire the target dimensionality reduction value and the test dimensionality reduction value The PLDA (Probabilistic Linear Discriminant Analysis) algorithm is a channel compensation algorithm. The PLDA is based on the I-vector feature, because the I-vector feature contains both speaker difference information and channel difference information, and we only care about the speaker information, so that the channel compensation is required. The channel compensation ability of the PLDA algorithm is better than that of the LDA algorithm.

In an embodiment, the PLDA algorithm comprises the following steps:

(1) initializing μ and W;
(2) calculating w using $$w \leftarrow \frac{W_i^{-\frac{1}{2}}(w-\mu_i)}{\|W_i^{-\frac{1}{2}}(w-\mu_i)\|};$$

and
(3) calculating W again using $$W = \frac{1}{n}\sum_{s=1}^{s}\sum_{i=1}^{n_s}(w_i^s - y_s)(w_i^s - y_s)^t,$$

and returning to the step of calculating w using $$w \leftarrow \frac{W_i^{-\frac{1}{2}}(w-\mu_i)}{\|W_i^{-\frac{1}{2}}(w-\mu_i)\|},$$

until w is less than a specified threshold;
wherein μ is a mean voiceprint vector; W is the distance between classes; w is the voiceprint feature; and i is the number of iterations;

S42: Cosine measurement is performed on the target dimensionality reduction value and the test dimensionality reduction value using a cosine measurement function to acquire a cosine measurement value.

In an embodiment, the cosine measurement function comprises:

$$\text{score}(w_{train}, w_{test}) = \frac{(w_{train})^t w_{test}}{\|w_{train}\|\|w_{test}\|},$$

wherein $w_{train}$ is the target voiceprint feature, $w_{test}$ is the test voiceprint feature, and t is the time. The use of the cosine measurement function may easily measure the distance between the target voiceprint feature and the test voiceprint feature. When the target voiceprint feature and the test voiceprint feature may be expanded within a specified limited dimensionality space, the cosine measurement function is calculated easily and has a direct and effective effect.

S43: It is judged whether the cosine measurement value is greater than a similarity threshold; wherein if the cosine measurement value is greater than a similarity threshold, the target voiceprint feature and the test voiceprint feature correspond to the same user; and if the cosine measurement value is not greater than a similarity threshold, the target voiceprint feature and the test voiceprint feature do not correspond to the same user In an embodiment, if score($w_{train}$, $w_{test}$)>K, the speaker corresponding to the target voiceprint feature and the speaker corresponding to the test voiceprint feature are the same user; otherwise, if score($w_{train}$, $w_{test}$)≤K, the speaker corresponding to the target voiceprint feature and the speaker corresponding to the test voiceprint feature are not the same user; where K is a similarity threshold, which may be a constant greater than 50%.

S50: The client receives and displays the result of the judging.

The result of the judging may be a result of the judging that the speaker of the test voiceprint feature which corresponds to the test voice and the speaker of the target voiceprint feature stored in the voiceprint feature library are believed to be the same user or be not the same user.

In the voiceprint recognition method provided by the present invention, the background server acquires a corresponding target voiceprint feature based on the user ID in the voice recognition request to be processed, and acquires a test voiceprint feature based on the test voice in the voice recognition request to be processed, and compares the target voiceprint feature with the test voiceprint feature to determine whether the speakers of the target voiceprint feature and the test voiceprint feature are the same user, which may achieve a fast voice recognition effect and improve the voice recognition efficiency. In addition, the background server determines the voice recognition request to be processed with a message queue and an asynchronous mechanism so as to improve the processing efficiency of a large number of voice recognition requests, and avoid the loss of some voice recognition requests due to a long processing time.

In an implementation, the voiceprint recognition method further comprises the following steps.

S51: MFCC feature extraction is performed on a training voice to acquire an MFCC acoustic feature.

MFCC is referred to as Mel Frequency Cepstrum Coefficients. The process of performing MFCC feature extraction on a training voice comprises: pre-emphasizing, framing and windowing the training voice; acquiring then a corresponding frequency spectrum by the FFT (Fast Fourier Transform) for each short-time analysis window; acquiring then the Mel frequency by making the above spectrum pass through a Mel filter bank; performing cepstrum analysis on the Mel spectrum (taking a logarithm, making inverse transform in which the inverse transform is generally achieved by DCT discrete cosine transform in fact, taking the second coefficient to the thirteenth coefficient after DCT as the MFCC coefficients) to acquire the Mel frequency cepstrum coefficients MFCC so as to acquire the MFCC acoustic feature.

S52: Voice activity detection is performed on the MFCC acoustic feature to estimate a Gaussian mixture model parameter.

The voice activity detection makes voice and noise judgment on different characteristics of voices and noises using a voice activity detection (VAD) algorithm to detect a voice signal segment and a noise signal segment from the digital signals acquired by continuously sampling, and the MFCC acoustic feature of the voice signal segment is used to estimate the parameter set of the Gaussian Mixture Model (referred to as the GMM model). In an embodiment, the voice activity detection algorithm is used to calculate voice feature parameters such as short-term energy, short-term zero-crossing rate and short-time autocorrelation so as to remove mute signals and non-voice signals and reserve the non-mute and voice signals for estimating the Gaussian mixture model parameter. In the present embodiment, the zero-order, the first-order, and the second-order amount of the MFCC acoustic feature is used to estimate the Gaussian mixture model parameter.

S53: The universal background model is trained with the Gaussian mixture model parameter to acquire the Gaussian mixture model-universal background model.

In the present embodiment, factor analysis is performed on the Gaussian mixture model parameter through the universal background model to acquire the Gaussian mixture model-universal background model. In an embodiment, the factor analysis algorithm of the universal background model comprises: s=m+Tw, where m is an average sound, i.e., a mean vector; T is a voiceprint space mapping matrix; w is a voiceprint difference vector, i.e., the I-vector feature. Factor analysis is performed on the acoustic feature represented by the Gaussian mixture model using the factor analysis algorithm, and the mean vector (a mean value) of the acoustic feature is separated from the voiceprint difference vector (a margin) to acquire the I-vector feature. The factor analysis algorithm may separate the voiceprint difference vector between different voices, and it is easier to extract the voiceprint specificity between different voices.

S54: A voiceprint registration request is received, wherein the voiceprint registration request comprises a user ID and a target training voice.

In the present embodiment, the client receives the voiceprint registration request input by a user, and sends the voiceprint registration request to a server, and the server receives the voiceprint registration request.

S55: Feature extraction is performed on the target training voice with the Gaussian mixture model-universal background model to acquire the target voiceprint feature.

In an embodiment, the server performs feature extraction on the target training voice using the trained Gaussian mixture model-universal background model to acquire the target voiceprint feature. That is to say, MFCC feature extraction is first performed on the target training voice to acquire the corresponding target MFCC acoustic feature, and then voice activity detection is performed on the target MFCC acoustic feature, and then the MFCC acoustic feature after being subjected to voice activity detection is placed into the trained Gaussian mixture model-universal background model to perform feature extraction so as to acquire the target voiceprint feature.

S56: The user ID and the target voiceprint feature are stored in the voiceprint feature library.

In the present embodiment, the user ID in the voiceprint registration request and the target voiceprint feature acquired based on the target training voice are stored in the voiceprint feature library, so that when the user ID recognition is required, the corresponding target voiceprint feature may be invoked based on the user ID.

In the implementation, the Gaussian mixture model parameter is estimated by performing MFCC feature extraction and voice activity detection on the training voice, and the universal background model is trained with the Gaussian mixture model parameter to acquire the trained Gaussian mixture model-universal background model. The Gaussian mixture model-universal background model has an advantage such as a high recognition rate. The voiceprint registration request is then received, feature extraction is performed on the target training voice in the voiceprint registration request through the trained Gaussian mixture model-universal background model to acquire the target voiceprint feature, and the target voiceprint feature and the user ID are stored in the voiceprint feature library, so that in the process of voice recognition, the corresponding target voiceprint feature is acquired based on the user ID in the voice recognition request to be processed and is compared with the test voiceprint feature to determine whether the speakers of the target voiceprint feature and the test voiceprint feature are the same user in order to achieve the voice recognition effect.

Embodiment 2

Figure 2:
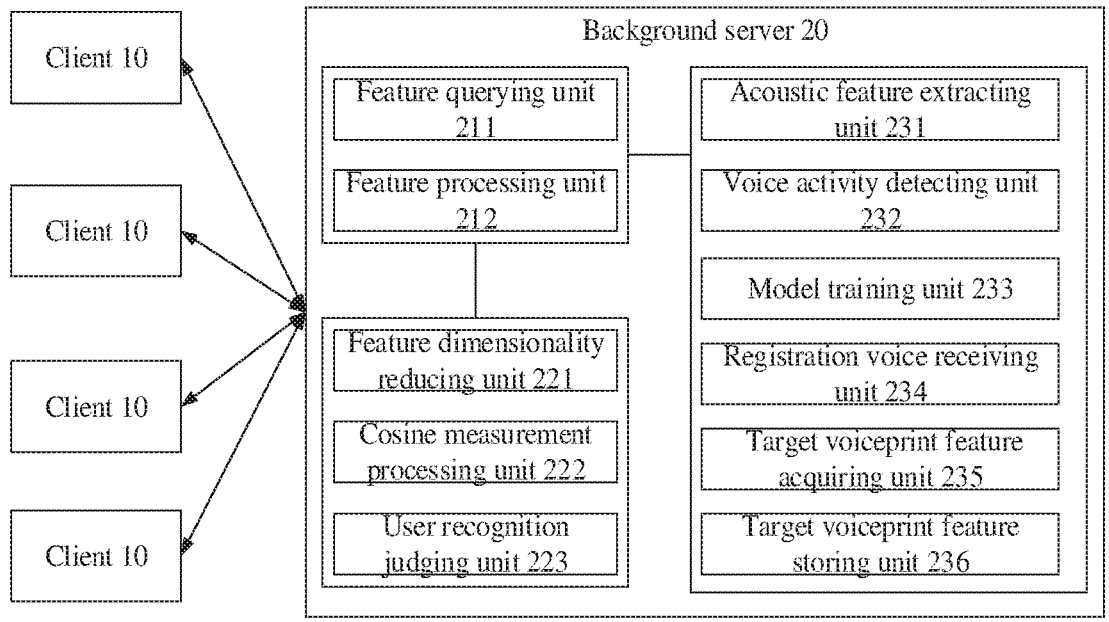
FIG. 2 is a schematic block diagram of a voiceprint recognition device according to Embodiment 2 of the present invention.

FIG. 2 shows a flow chart of a voiceprint recognition device in the embodiment. The voiceprint recognition device may comprise a client and a background server to perform identity recognition on the test voice collected by the client. As shown in FIG. 2, the voiceprint recognition device comprises a client 10 and a background server 20.

The client 10 is configured to collect a test voice of a user, and send a voice recognition request to the background server, wherein the voice recognition request comprises the user ID and the test voice.

The client 10 comprises a terminal capable of communicating with a background server, such as a smart phone, a notebook, a desktop computer, etc., and the client is provided with a microphone configured to collect the test voice or an external microphone interface. The user ID is used to uniquely identify the user ID. In the present embodiment, the test voice is associated with the user ID, and is configured to determine a user corresponding to the test voice. The client performs sampling and recording on the user, acquires the test voice in a wav audio format, forms a voice recognition request according to the test voice and the user ID, and sends the voice recognition request to the background server.

Further, when the client is a mobile client, a multi-thread method is used to collect the test voice; when the client is a webpage client, an Ajax asynchronous refreshing method is used to collect the test voice so as to not interrupt user operation when communicating with the background server and to increase the collecting speed of a test request. Ajax (Asynchronous JavaScript and XML), Asynchronous JavaScript and XML are web application development methods that use client scripts to exchange data with a web server.

The background server 20 is configured to receive the voice recognition request, and determine the voice recognition request to be processed with a message queue and an asynchronous mechanism.

The background server 20 receives the voice recognition request sent by at least one client, and places at least one voice recognition request into the message queue for waiting. The background server uses an asynchronous mechanism to schedule at least one voice recognition request in the message queue so that the transmitter and the receiver are independent of each other when the background server processes each message in the message queue without waiting for the other party to respond. The message queue and asynchronous mechanism is used to schedule at least one voice recognition request to acquire the voice recognition request to be processed so that the background server may receive a large number of voice recognition requests at the same time and avoid the loss of a large number of other voice recognition requests due to a long processing time of any voice recognition request to be processed. On the other hand, the message queue and asynchronous mechanism is also used so as to build a distributed system in the background server, which may improve the peak processing capacity and flexibility of voice recognition requests, reduce the coupling degree between processes, and ensure that each voice recognition request can be processed.

The background server 20 is configured to acquire a target voiceprint feature which corresponds to the user ID of the voice recognition request to be processed, and acquire a test voiceprint feature which corresponds to the test voice of the voice recognition request to be processed.

In an embodiment, the target voiceprint feature is a voiceprint feature of a user corresponding to the user ID pre-stored in the background server. The test voiceprint feature is the voiceprint feature which corresponds to the test voice in the voice request. The voiceprint is an acoustic wave spectrum carrying verbal information and displayed using an electro-acoustic instrument. Correspondingly, the voiceprint feature comprises, but is not limited to, an acoustic feature related to the anatomical structure of a human vocalization mechanism such as a spectrum, a cepstrum, a formant, a pitch, a reflection coefficient, a nasal sound, a voice with a deep breath, a hoarse voice, a laughter, etc.

In the present embodiment, the target voiceprint feature and the test voiceprint feature are preferably I-vector (i.e., identifying vector) features. Correspondingly, any of I-vector features can be acquired by an I-vector algorithm. The i-vector algorithm is a method for estimating a hidden variable. A fixed-length low-dimensional vector is used to represent a segment of voices. Instead of considering the variances within and between classes separately, the variances within and between classes are considered in a sub-space (i.e., the total variability space) in the process of extracting the I-vector features, so that they may be trained in an unsupervised manner and language-neutral information may be removed in the total variability space. Language-related acoustic information is reserved to the utmost extent while reducing the dimensionality and denoising.

Further, the background server 20 comprises a feature querying unit 211 and a feature processing unit 212.

The feature querying unit 211 is configured to query a voiceprint feature library according to the user ID of the voice recognition request to be processed to acquire the target voiceprint feature which corresponds to the user ID of the voice recognition request to be processed.

In an embodiment, at least one group of user IDs and the target voiceprint feature associated with the user IDs are pre-stored in the voiceprint feature library, so as to look for the corresponding target voiceprint feature based on the user ID in the voice recognition request to be processed.

The feature processing unit 212 is configured to process the test voiceprint feature of the voice recognition request to be processed using a Gaussian mixture model-universal background model to acquire the test voiceprint feature which corresponds to the test voice of the voice recognition request to be processed.

The Gaussian mixture model-universal background model (referred to as GMM-UBM in short) is a speaker-independent, high-order GMM that trains voice adaptive training according to the speaker. That is to say, the voice model reflects the pronunciation that is not contained in the model through the speaker in his own voice and distributes approximate description with a speaker-independent voice feature, which has a characteristic such as a high recognition rate.

In an embodiment, the background server 20 places the received voice recognition request into the message queue for waiting. When a process is idle, the voice recognition request to be processed is removed from the message queue to be handed to a background Servlet container for processing, the Servlet container creates an HttpRequest object, the sent information is encapsulated into this object, a HttpResponse object is created at the same time, the HttpRequest and the HttpResponse are passed to the HttpServlet object as parameters, the service method of the HttpServlet object is invoked, and the Gaussian mixture model-universal background model is invoked to process the test voice in the service method to acquire the test voiceprint feature.

The background server 20 judges, according to the target voiceprint feature and the test voiceprint feature, whether the target voiceprint feature and the test voiceprint feature correspond to the same user, and outputs the result of the judging to the client.

Since the target voiceprint feature is a voiceprint feature associated with the user ID and pre-stored in the voiceprint feature library, and the test voiceprint feature is a voiceprint feature which corresponds to the test voice associated with the user ID and collected by the client, if the target voiceprint feature and the test voiceprint feature are the same or have a similarity that reaches a preset similarity threshold, it may be believed that the target voiceprint feature and the test voiceprint feature correspond to the same user, so as to output the result of the judging that the target voiceprint feature and the test voiceprint feature correspond to the same user or do not correspond to the same user to the client.

Further, in an embodiment, the background server 20 comprises a feature dimensionality reducing unit 221, a cosine measurement processing unit 222 and a user recognition judging unit 223.

The feature dimensionality reducing unit 221 is configured to reduce the dimensionality of the target voiceprint feature and the test voiceprint feature respectively with a PLDA algorithm, to acquire the target dimensionality reduction value and the test dimensionality reduction value The PLDA (Probabilistic Linear Discriminant Analysis) algorithm is a channel compensation algorithm. The PLDA is based on the I-vector feature, because the I-vector feature contains both speaker difference information and channel difference information, and we only care about the speaker information, so that the channel compensation is required. The channel compensation ability of the PLDA algorithm is better than that of the LDA algorithm.

In an embodiment, the PLDA algorithm comprises the following steps:

(1) initializing $\mu$ and W;
(2) calculating w using $$w \leftarrow \frac{W_i^{-\frac{1}{2}}(w - \mu_i)}{\left\|W_i^{-\frac{1}{2}}(w - \mu_i)\right\|};$$

and
(3) calculating W again using $$W = \frac{1}{n}\sum_{s=1}^{s}\sum_{i=1}^{n_s}(w_i^s - y_s)(w_i^s - y_s)^t,$$

and returning to the step of calculating w using $$w \leftarrow \frac{W_i^{-\frac{1}{2}}(w - \mu_i)}{\left\|W_i^{-\frac{1}{2}}(w - \mu_i)\right\|},$$

until w is less than a specified threshold;
wherein $\mu$ is a mean voiceprint vector; W is the distance between classes; w is the voiceprint feature; and i is the number of iterations;

The cosine measurement processing unit 222 is configured to perform cosine measurement on the target dimensionality reduction value and the test dimensionality reduction value using a cosine measurement function to acquire a cosine measurement value.

In an embodiment, the cosine measurement function comprises:

$$\text{score}(w_{train}, w_{test}) = \frac{(w_{train})^t w_{test}}{\|w_{train}\|\|w_{test}\|},$$

wherein $w_{train}$ is the target voiceprint feature, $w_{test}$ is the test voiceprint feature, and t is the time. The use of the cosine measurement function may easily measure the distance between the target voiceprint feature and the test voiceprint feature. When the target voiceprint feature and the test voiceprint feature may be expanded within a specified limited dimensionality space, the cosine measurement function is calculated easily and has a direct and effective effect.

The user recognition judging unit 223 is configured to judge whether the cosine measurement value is greater than a similarity threshold; wherein if the cosine measurement value is greater than a similarity threshold, the target voiceprint feature and the test voiceprint feature correspond to the same user; and if the cosine measurement value is not greater than a similarity threshold, the target voiceprint feature and the test voiceprint feature do not correspond to the same user In an embodiment, if $\text{score}(w_{train}, w_{test}) > K$, the speaker corresponding to the target voiceprint feature and the speaker corresponding to the test voiceprint feature are the same user; otherwise, if $\text{score}(w_{train}, w_{test}) \leq K$, the speaker corresponding to the target voiceprint feature and the speaker corresponding to the test voiceprint feature are not the same user; where K is a similarity threshold, which may be a constant greater than 50%.

The client 10 is configured to receive and display the result of the judging.

The result of the judging may be a result of the judging that the speaker of the test voiceprint feature which corresponds to the test voice and the speaker of the target voiceprint feature stored in the voiceprint feature library are believed to be the same user or be not the same user.

In the voiceprint recognition device provided by the present invention, the background server acquires a corresponding target voiceprint feature based on the user ID in the voice recognition request to be processed, and acquires a test voiceprint feature based on the test voice in the voice recognition request to be processed, and compares the target voiceprint feature with the test voiceprint feature to determine whether the speakers of the target voiceprint feature and the test voiceprint feature are the same user, which may achieve a fast voice recognition effect and improve the voice recognition efficiency. In addition, the background server determines the voice recognition request to be processed with a message queue and an asynchronous mechanism so as to improve the processing efficiency of a large number of voice recognition requests, and avoid the loss of some voice recognition requests due to a long processing time.

In an implementation, the voiceprint recognition device further comprises an acoustic feature extracting unit 231, a voice activity detecting unit 232, a model training unit 233, a registration voice receiving unit 234, a target voiceprint feature acquiring unit 235, and a target voiceprint feature storing unit 236.

The acoustic feature extracting unit 231 is configured to perform MFCC feature extraction on a training voice to acquire an MFCC acoustic feature.

MFCC is referred to as Mel Frequency Cepstrum Coefficients. The process of performing MFCC feature extraction on a training voice comprises: pre-emphasizing, framing and windowing the training voice; acquiring then a corresponding frequency spectrum by the FFT (Fast Fourier Transform) for each short-time analysis window; acquiring then the Mel frequency by making the above spectrum pass through a Mel filter bank; performing cepstrum analysis on the Mel spectrum (taking a logarithm, making inverse transform in which the inverse transform is generally achieved by DCT discrete cosine transform in fact, taking the second coefficient to the thirteenth coefficient after DCT as the MFCC coefficients) to acquire the Mel frequency cepstrum coefficients MFCC so as to acquire the MFCC acoustic feature.

The voice activity detecting unit 232 is configured to perform voice activity detection on the MFCC acoustic feature to estimate a Gaussian mixture model parameter.

The voice activity detection makes voice and noise judgment on different characteristics of voices and noises using a voice activity detection (VAD) algorithm to detect a voice signal segment and a noise signal segment from the digital signals acquired by continuously sampling, and the MFCC acoustic feature of the voice signal segment is used as the parameter set of the Gaussian Mixture Model (referred to as the GMM model). In an embodiment, the voice activity detection algorithm is used to calculate voice feature parameters such as short-term energy, short-term zero-crossing rate and short-time autocorrelation so as to remove mute signals and non-voice signals and reserve the non-mute and voice signals for estimating the Gaussian mixture model parameter. In the present embodiment, the zero-order, the first-order, and the second-order amount of the MFCC acoustic feature is used to estimate the Gaussian mixture model parameter.

The model training unit 233 is configured to train the universal background model with the Gaussian mixture model parameter to acquire the Gaussian mixture model-universal background model.

In the present embodiment, factor analysis is performed on the Gaussian mixture model parameter through the universal background model to acquire the Gaussian mixture model-universal background model. In an embodiment, the factor analysis algorithm of the universal background model comprises: s=m+Tw, where m is an average sound, i.e., a mean vector; T is a voiceprint space mapping matrix; w is a voiceprint difference vector, i.e., the I-vector feature. Factor analysis is performed on the acoustic feature represented by the Gaussian mixture model using the factor analysis algorithm, and the mean vector (a mean value) of the acoustic feature is separated from the voiceprint difference vector (a margin) to acquire the I-vector feature. The factor analysis algorithm may separate the voiceprint difference vector between different voices, and it is easier to extract the voiceprint specificity between different voices.

The registration voice receiving unit 234 is configured to receive a voiceprint registration request, wherein the voiceprint registration request comprises a user ID and a target training voice. In the present embodiment, the client receives the voiceprint registration request input by a user, and sends the voiceprint registration request to a server, and the server receives the voiceprint registration request.

The target voiceprint feature acquiring unit 235 is configured to perform feature extraction on the target training voice with the Gaussian mixture model-universal background model to acquire the target voiceprint feature. In an embodiment, the server performs feature extraction on the target training voice using the trained Gaussian mixture model-universal background model to acquire the target voiceprint feature. That is to say, MFCC feature extraction is first performed on the target training voice to acquire the corresponding target MFCC acoustic feature, and then voice activity detection is performed on the target MFCC acoustic feature, and then the MFCC acoustic feature after being subjected to voice activity detection is placed into the trained Gaussian mixture model-universal background model to perform feature extraction so as to acquire the target voiceprint feature.

The target voiceprint feature storing unit 236 is configured to store the user ID and the target voiceprint feature in the voiceprint feature library. In the present embodiment, the user ID in the voiceprint registration request and the target voiceprint feature acquired based on the target training voice are stored in the voiceprint feature library, so that when the user ID recognition is required, the corresponding target voiceprint feature may be invoked based on the user ID.

In the voiceprint recognition device provided by the implementation, the Gaussian mixture model parameter is estimated by performing MFCC feature extraction and voice activity detection on the training voice, and the universal background model is trained with the Gaussian mixture model parameter to acquire the trained Gaussian mixture model-universal background model. The Gaussian mixture model-universal background model has an advantage such as a high recognition rate. The voiceprint registration request is then received, feature extraction is performed on the target training voice in the voiceprint registration request through the trained Gaussian mixture model-universal background model to acquire the target voiceprint feature, and the target voiceprint feature and the user ID are stored in the voiceprint feature library, so that in the process of voice recognition, the corresponding target voiceprint feature is acquired based on the user ID in the voice recognition request to be processed and is compared with the test voiceprint feature to determine whether the speakers of the target voiceprint feature and the test voiceprint feature are the same user in order to achieve the voice recognition effect.

Figure 3:
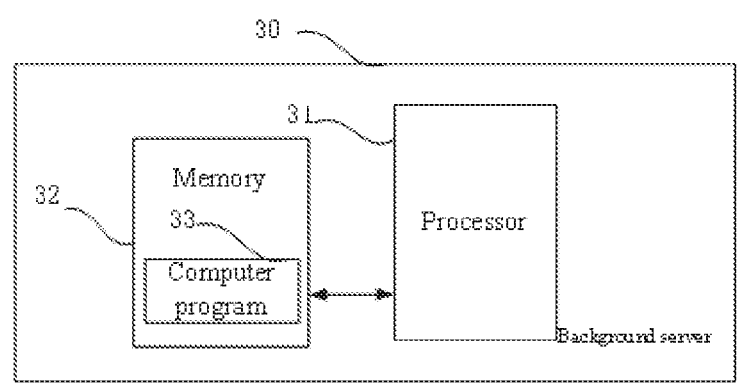
FIG. 3 is a schematic diagram of a background server provided by an embodiment of the present invention.

FIG. 3 is a schematic diagram of a background server provided by an embodiment of the present invention. As shown in FIG. 3, the background server 3 of the embodiment comprises a processor 30, a memory 31, and a computer program 32 stored in the memory 31 and executable on the processor 30, for example, a program executing the voiceprint recognition method described above. The processor 30, when executing the computer program 32, implements the steps in each embodiment of the voiceprint recognition method described above, for example, steps S10 to S50 shown in FIG. 1. Alternatively, the processor 30, when executing the computer program 32, implements the function of each module/unit in each device embodiment described above, for example, the function of each unit on the background server 20 shown in FIG. 2.

Exemplarily, the computer program 32 may be segmented into one or more modules/units, which are stored in the memory 31 and executed by the processor 30 to complete the present invention. The one or more modules/units may be a series of computer program instruction segments capable of fulfilling a specific function for describing the execution of the computer program 32 in the background server 3.

The background server 3 may be a computing device such as a local server, a cloud server, etc. The background server may comprise, but not limited to, a processor 30 and a memory 31. It may be understood by those skilled in the art that FIG. 3 is merely an example of the background server 3 and does not constitute a limitation on the background server 3, and may comprise more or fewer components than those shown, or combine certain components or different components. For example, the background server may further comprise an input/output device, a network access device, a bus, etc.

The processor 30 may be a Central Processing Unit (CPU) or other general-purpose processors, a Digital Signal Processor (DSP), an Application Specific Integrated Circuit (ASIC), a Field-Programmable Gate Array (FPGA), or other programmable logic devices, a discrete gate or a transistor logic device, a discrete hardware component, etc. The general-purpose processor may be a microprocessor or the processor may also be any of conventional processors, etc.

The memory 31 may be an internal storage unit of the background server 3, such as a hard disk or memory of the background server 3. The memory 31 may also be an external storage device of the background server 3, such as a plug-in hard disk, a Smart Media Card (SMC), a Secure Digital (SD) card, a Flash Card, etc. equipped on the background server 3. Further, the memory 31 may further comprise both an internal storage unit and an external storage device of the background server 3. The memory 31 is configured to store the computer program and other programs and data required by the background server. The memory 31 may also be configured to temporarily store data that has been output or is to be output.

While the present invention has been described in terms of several embodiments, it will be understood by those skilled in the art that various changes and equivalent replacements may be made to the present invention without departing from the scope of the present invention. In addition, various modifications may be made to the present invention for a particular situation or a specific case without departing from the scope of the present invention. Therefore, the present invention is not limited to the embodiments disclosed, but should comprise all the implementations which fall within the scope of the claims of the present invention.

What is claimed is:

1. A voiceprint recognition method, comprising:
    collecting, by a client, a test voice of a user, and sending a voice recognition request to the background server, the voice recognition request comprises a user ID and the test voice;
    receiving, by the background server, the voice recognition request, and determining the voice recognition request to be processed with a message queue and an asynchronous mechanism;
    acquiring, by the background server, a target voiceprint feature which corresponds to the user ID of the voice recognition request to be processed, and acquiring a test voiceprint feature which corresponds to the test voice of the voice recognition request to be processed;
    judging, by the background server according to the target voiceprint feature and the test voiceprint feature, whether the target voiceprint feature and the test voiceprint feature correspond to the same user, and outputting the result of the judging to the client; and
    receiving and displaying, by the client, the result of the judging;
    wherein it is judged according to the target voiceprint feature and the test voiceprint feature whether the target voiceprint feature and the test voiceprint feature correspond to the same user, comprising:
    applying dimensionality reduction to the target voiceprint feature and the test voiceprint feature respectively with a PLDA algorithm, to acquire the target dimensionality reduction value and the test dimensionality reduction value;
    performing cosine measurement on the target dimensionality reduction value and the test dimensionality reduction value using a cosine measurement function to acquire a cosine measurement value; and
    judging whether the cosine measurement value is greater than a similarity threshold; wherein if the cosine measurement value is greater than a similarity threshold, the target voiceprint feature and the test voiceprint feature correspond to the same user; and if the cosine measurement value is not greater than a similarity threshold, the target voiceprint feature and the test voiceprint feature do not correspond to the same user.

2. The voiceprint recognition method according to claim 1, wherein the background server acquires a target voiceprint feature which corresponds to the user ID of the voice recognition request to be processed and acquires a test voiceprint feature which corresponds to the test voice of the voice recognition request to be processed, comprising:
    querying a voiceprint feature library according to the user ID of the voice recognition request to be processed to acquire the target voiceprint feature which corresponds to the user ID of the voice recognition request to be processed; and
    processing the test voiceprint feature of the voice recognition request to be processed using a Gaussian mixture model-universal background model to acquire the test voiceprint feature which corresponds to the test voice of the voice recognition request to be processed.

3. The voiceprint recognition method according to claim 2, further comprising:
    performing MFCC feature extraction on a training voice to acquire an MFCC acoustic feature;
    performing voice activity detection on the MFCC acoustic feature to estimate a Gaussian mixture model parameter;
    training the universal background model with the Gaussian mixture model parameter to acquire the Gaussian mixture model-universal background model;
    receiving a voiceprint registration request, wherein the voiceprint registration request comprises a user ID and a target training voice;
    training the target training voice with the Gaussian mixture model-universal background model to acquire the target voiceprint feature; and
    storing the user ID and the target voiceprint feature in the voiceprint feature library.

4. The voiceprint recognition method according to claim 1, wherein the PLDA algorithm comprises:
    initializing $\mu$ and $W$;
    calculating w using $$w \leftarrow \frac{W_i^{-\frac{1}{2}}(w - \mu_i)}{\left\| W_i^{-\frac{1}{2}}(w - \mu_i) \right\|};$$

and
    calculating W again using $$W = \frac{1}{n} \sum_{s=1}^{s} \sum_{i=1}^{n_s} (w_i^s - y_s)(w_i^s - y_s)^t,$$

and returning to the step of calculating w using $$w \leftarrow \frac{W_i^{-\frac{1}{2}}(w - \mu_i)}{\left\| W_i^{-\frac{1}{2}}(w - \mu_i) \right\|},$$

until w is less than a specified threshold;
    wherein $\mu$ is a mean voiceprint vector; W is the distance between classes; w is the voiceprint feature; and i is the number of iterations;
    the cosine measurement function comprises:

$$\text{score}(w_{train}, w_{test}) = \frac{(w_{train})^t w_{test}}{\|w_{train}\| \|w_{test}\|}$$

wherein $w_{train}$ is the target voiceprint feature, $w_{test}$ is the test voiceprint feature, and t is the time.

5. A voiceprint recognition device, comprising:
a client configured to collect a test voice of a user and send a voice recognition request to the background server, the voice recognition request comprises a user ID and the test voice;
a background server configured to receive the voice recognition request and determine the voice recognition request to be processed with a message queue and an asynchronous mechanism;
a background server configured to acquire a target voiceprint feature which corresponds to the user ID of the voice recognition request to be processed, and acquire a test voiceprint feature which corresponds to the test voice of the voice recognition request to be processed;
a background server configured to judge, according to the target voiceprint feature and the test voiceprint feature, whether the target voiceprint feature and the test voiceprint feature correspond to the same user, and output the result of the judging to the client; and
a client configured to receive and display the result of the judging;
wherein the background server comprises:
a feature dimensionality reducing unit configured to reduce the dimensionality of the target voiceprint feature and the test voiceprint feature respectively with a PLDA algorithm, to acquire the target dimensionality reduction value and the test dimensionality reduction value;
a cosine measurement processing unit configured to perform cosine measurement on the target dimensionality reduction value and the test dimensionality reduction value using a cosine measurement function to acquire a cosine measurement value; and
a user recognition judging unit configured to judge whether the cosine measurement value is greater than a similarity threshold; wherein if the cosine measurement value is greater than a similarity threshold, the target voiceprint feature and the test voiceprint feature correspond to the same user; and if the cosine measurement value is not greater than a similarity threshold, the target voiceprint feature and the test voiceprint feature do not correspond to the same user.

6. The voiceprint recognition device according to claim 5, wherein the background server comprises:
a feature querying unit configured to query a voiceprint feature library according to the user ID of the voice recognition request to be processed to acquire the target voiceprint feature which corresponds to the user ID of the voice recognition request to be processed; and
a feature processing unit configured to process the test voiceprint feature of the voice recognition request to be processed using a Gaussian mixture model-universal background model to acquire the test voiceprint feature which corresponds to the test voice of the voice recognition request to be processed.

7. The voiceprint recognition device according to claim 6, wherein the background server further comprises:
an acoustic feature extracting unit configured to perform MFCC feature extraction on a training voice to acquire an MFCC acoustic feature;
a voice activity detecting unit configured to perform voice activity detection on the MFCC acoustic feature to estimate a Gaussian mixture model parameter;
a model training unit configured to train the universal background model with the Gaussian mixture model parameter to acquire the Gaussian mixture model-universal background model;
a registration voice receiving unit configured to receive a voiceprint registration request, wherein the voiceprint registration request comprises a user ID and a target training voice;
a target voiceprint feature acquiring unit configured to train the target training voice with the Gaussian mixture model-universal background model to acquire the target voiceprint feature; and
a target voiceprint feature storing unit configured to store the user ID and the target voiceprint feature in the voiceprint feature library.

8. The voiceprint recognition device according to claim 5, wherein the PLDA algorithm comprises:
initializing μ and W;
calculating w using $$w \leftarrow \frac{W_i^{-\frac{1}{2}}(w-\mu_i)}{\left\|W_i^{-\frac{1}{2}}(w-\mu_i)\right\|};$$

and
calculating W again using $$W = \frac{1}{n}\sum_{s=1}^{s}\sum_{i=1}^{n_s}(w_i^s - y_s)(w_i^s - y_s)^t,$$

and returning to the step of calculating w using $$w \leftarrow \frac{W_i^{-\frac{1}{2}}(w-\mu_i)}{\left\|W_i^{-\frac{1}{2}}(w-\mu_i)\right\|},$$

until w is less than a specified threshold;
wherein μ is a mean voiceprint vector; W is the distance between classes; w is the voiceprint feature; and i is the number of iterations;
the cosine measurement function comprises:

$$\text{score}(w_{train}, w_{test}) = \frac{(w_{train})^t w_{test}}{\|w_{train}\|\|w_{test}\|}$$

wherein $w_{train}$ is the target voiceprint feature, $w_{test}$ is the test voiceprint feature, and t is the time.

9. A background server comprising a memory, a processor, and a computer program stored in the memory and executable on the processor, wherein the processor, when executing the computer program, implements the steps of:
collecting, by a client, a test voice of a user, and sending a voice recognition request to the background server, the voice recognition request comprises a user ID and the test voice;
receiving, by the background server, the voice recognition request, and determining the voice recognition request to be processed with a message queue and an asynchronous mechanism;
acquiring, by the background server, a target voiceprint feature which corresponds to the user ID of the voice recognition request to be processed, and acquiring a test voiceprint feature which corresponds to the test voice of the voice recognition request to be processed;

judging, by the background server according to the target voiceprint feature and the test voiceprint feature, whether the target voiceprint feature and the test voiceprint feature correspond to the same user, and outputting the result of the judging to the client; and receiving and displaying, by the client, the result of the judging;

wherein it is judged according to the target voiceprint feature and the test voiceprint feature whether the target voiceprint feature and the test voiceprint feature correspond to the same user, comprising:

applying dimensionality reduction to the target voiceprint feature and the test voiceprint feature respectively with a PLDA algorithm, to acquire the target dimensionality reduction value and the test dimensionality reduction value;

performing cosine measurement on the target dimensionality reduction value and the test dimensionality reduction value using a cosine measurement function to acquire a cosine measurement value; and judging whether the cosine measurement value is greater than a similarity threshold; wherein if the cosine measurement value is greater than a similarity threshold, the target voiceprint feature and the test voiceprint feature correspond to the same user; and if the cosine measurement value is not greater than a similarity threshold, the target voiceprint feature and the test voiceprint feature do not correspond to the same user.

10. The background server according to claim 9, wherein the background server acquires a target voiceprint feature which corresponds to the user ID of the voice recognition request to be processed and acquires a test voiceprint feature which corresponds to the test voice of the voice recognition request to be processed, comprising:

querying a voiceprint feature library according to the user ID of the voice recognition request to be processed to acquire the target voiceprint feature which corresponds to the user ID of the voice recognition request to be processed; and processing the test voiceprint feature of the voice recognition request to be processed using a Gaussian mixture model-universal background model to acquire the test voiceprint feature which corresponds to the test voice of the voice recognition request to be processed.

11. The background server according to claim 10, further comprising:

performing MFCC feature extraction on a training voice to acquire an MFCC acoustic feature;

performing voice activity detection on the MFCC acoustic feature to estimate a Gaussian mixture model parameter;

training the universal background model with the Gaussian mixture model parameter to acquire the Gaussian mixture model-universal background model;

receiving a voiceprint registration request, wherein the voiceprint registration request comprises a user ID and a target training voice;

training the target training voice with the Gaussian mixture model-universal background model to acquire the target voiceprint feature; and storing the user ID and the target voiceprint feature in the voiceprint feature library.

12. The background server according to claim 9, wherein the PLDA algorithm comprises:

initializing μ and W;

calculating w using $$w \leftarrow \frac{W_i^{-\frac{1}{2}}(w-\mu_i)}{\left\|W_i^{-\frac{1}{2}}(w-\mu_i)\right\|};$$

and calculating W again using $$W = \frac{1}{n}\sum_{s=1}^{s}\sum_{i=1}^{n_s}(w_i^s - y_s)(w_i^s - y_s)^t,$$

and returning to the step of calculating w using $$w \leftarrow \frac{W_i^{-\frac{1}{2}}(w-\mu_i)}{\left\|W_i^{-\frac{1}{2}}(w-\mu_i)\right\|},$$

until w is less than a specified threshold;

wherein μ is a mean voiceprint vector; W is the distance between classes; w is the voiceprint feature; and i is the number of iterations;

the cosine measurement function comprises:

$$\text{score}(w_{train}, w_{test}) = \frac{(w_{train})^t w_{test}}{\|w_{train}\|\|w_{test}\|}$$

wherein $w_{train}$ is the target voiceprint feature, $w_{test}$ is the test voiceprint feature, and t is the time.

* * * * *